United States Patent [19]
Goldberg et al.

[11] Patent Number: 5,951,854
[45] Date of Patent: Sep. 14, 1999

[54] FILTERING APPLIANCE FOR FILTERING A LIQUID

[75] Inventors: Margaret Buchart Goldberg; Terence Murray Goldberg, both of Perth; Michael Phillip Griese, Angus, all of United Kingdom

[73] Assignee: Murray Buchart Innovations Limited, United Kingdom

[21] Appl. No.: 08/958,362

[22] Filed: Oct. 27, 1997

Related U.S. Application Data

[63] Continuation of application No. 08/716,423, Sep. 20, 1996, Pat. No. 5,681,466.

[51] Int. Cl.⁶ .................................................. B01D 29/00
[52] U.S. Cl. .......................... 210/85; 210/143; 210/167; 210/238; 210/416.1; 210/416.5; 210/435; 210/470
[58] Field of Search .................................. 210/167, 350, 210/356, 416.1, 416.5, 238, 435, 143, 453, 85, 479, 488, 470

[56] References Cited

U.S. PATENT DOCUMENTS

| | | | |
|---|---|---|---|
| 4,301,005 | 11/1981 | Schon et al. | 210/238 |
| 4,702,827 | 10/1987 | Wenzel | 210/167 |
| 4,759,842 | 7/1988 | Frees et al. | 210/453 |
| 5,035,811 | 7/1991 | Grondin et al. | 210/806 |

*Primary Examiner*—David A. Reifsnyder
*Attorney, Agent, or Firm*—Gifford, Krass, Groh, Sprinkle, Anderson & Citkowski, P.C.

[57] ABSTRACT

A filtering appliance for cleaning cooking oil in a food fryer is designed and dimensioned for single-handed portable use in "hand-gun" fashion. The appliance has an elongate casing means (10) with a hand grip (14) at one end adjacent a pump-and-motor assembly (21, 34). An intake nozzle (11) conducts oil to be cleaned to a cartridge style filter (29) made by stacking annular elements (30, 31) cut from a commercially available filter material of fibrous mat forming a matrix holding particulate filtering media. The filter (29) is axially spring loaded to accommodate yielding of the filter material. The appliance discharges into the food fryer through a duct (15) outside the casing means (10). Thus, the oil is re-circulated to achieve cleaning.

9 Claims, 2 Drawing Sheets

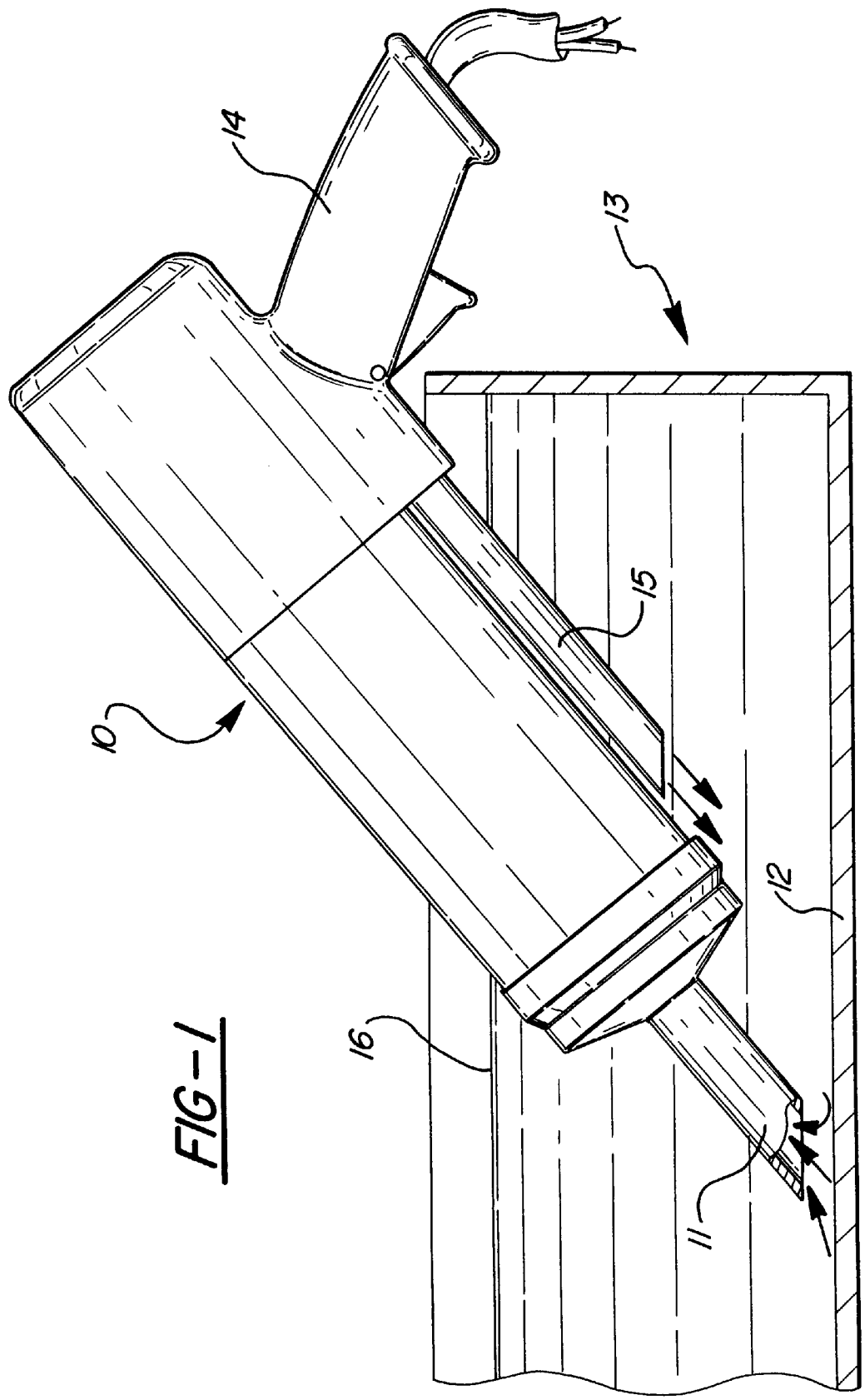

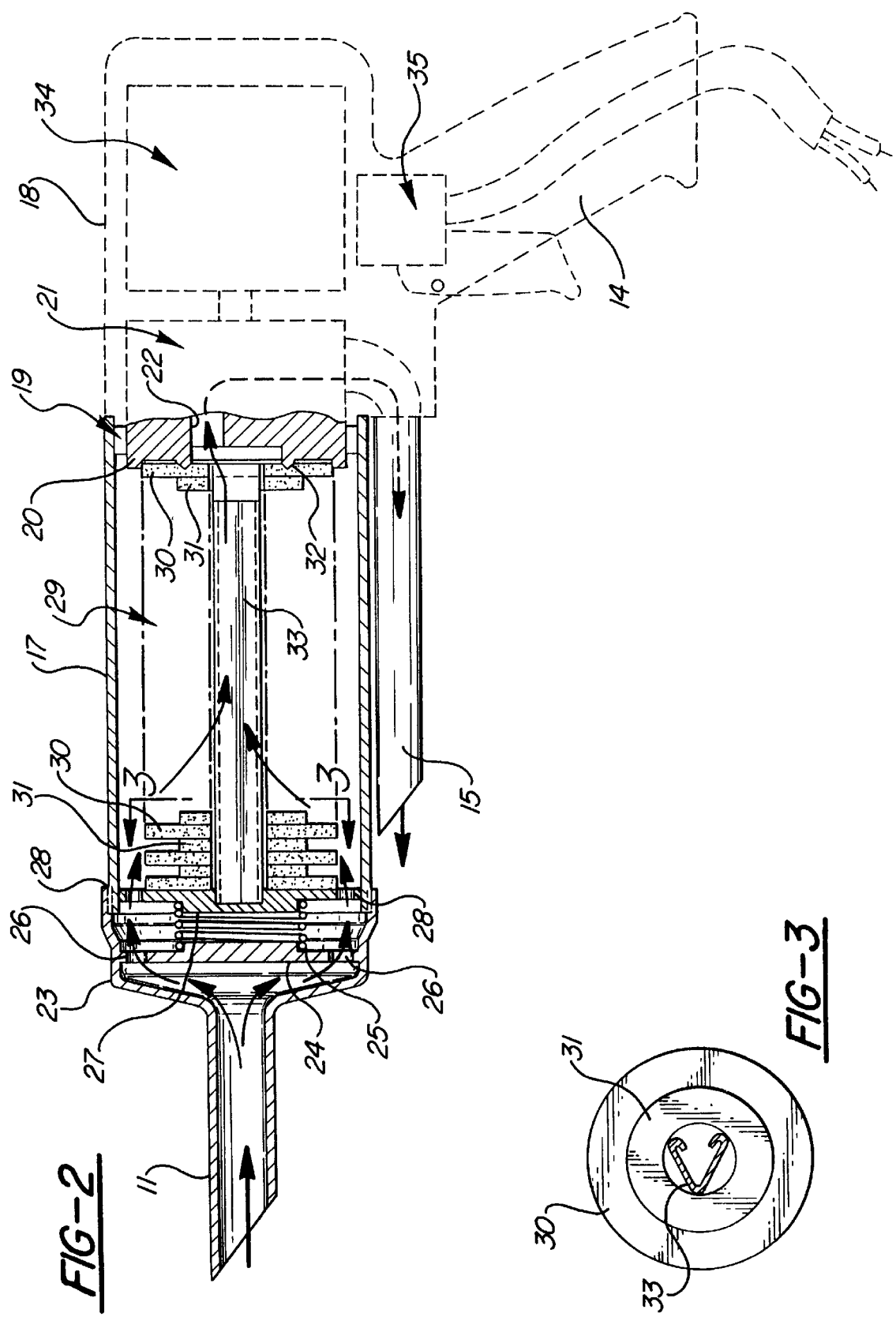

FILTERING APPLIANCE FOR FILTERING A LIQUID

This is a continuation of prior U.S. patent application Ser. No. 08/716,423, filed Sep. 20, 1996, now U.S. Pat. No. 5,681,466.

This invention relates to a filter and to a filtering appliance.

The invention is especially, but not exclusively, concerned with a filter and a filtering appliance both for use in removing debris and/or other matter from cooking oil in a food fryer.

According to the present invention, there is a provided a filtering appliance for use in removing debris and/or other matter from cooking oil in a food fryer, comprising an elongate casing means, an intake nozzle at one end of the casing means for sweeping over the floor of a food fryer, a hand grip means arranged at and secured to the other end of the casing means, the casing means the nozzle and the hand grip means together being dimensioned consistently with single-handed portable use of the appliance, a discharge duct means extending from within the casing means and arranged to discharge adjacent the outside of the casing means, a filter within the casing means, and a motor-and-pump means within the casing means and adapted and arranged for operation to move oil sequentially through said nozzle said filter and said discharge duct means.

By combining single-handed portability with motorised operation, an appliance in accordance with the present invention makes it feasible conveniently to clean or partially clean the oil in a food fryer several times during a single day without disrupting the use of the fryer to an unacceptable extent.

We have found that, having regard to the dimensional limitations imposed by the aforesaid single-handed portability, it is preferable to circulate oil through the filtering appliance at as high a rate, in terms of cubic measure per unit time, as possible. This demands an efficient filter which we have invented.

Further, according to the present invention, there is provided a filter comprising a plurality of annular elements stacked to form a generally hollow cylindrical configuration.

Still further, according to the present invention there is provided a filtering appliance comprising a tubular casing have a removable closure at one end and an apertured fixed wall adjacent the other end, a filter as aforesaid disposed in the casing abutting said apertured wall, an elongate former extending axially through the filter, a closure plate fixed to the former and arranged to abut and close the free end of the filter, spring means arranged to urge the said closure plate in a direction axially to compress the filter, and inlet means giving access to the casing.

Still further, according to the present invention, there is provided a filter comprising a plurality of annular elements stacked to form a generally hollow cylindrical configuration, said plurality of annular elements comprising at least two sets of annular elements, the elements of one set being all of relatively large diameter and the elements of the other set being all of relatively small diameter, the elements of respective sets being mutually interleaved, each annular element being cut from a mat of fibres bonded together to form a matrix, and particulate filtering medium or media held in said matrix.

An embodiment of the present invention will now be described, by way of example, with reference to the accompanying drawings in which:

FIG. 1 is a partly-sectioned side elevation showing a filter appliance in accordance with the present invention being used to remove debris and/or other matter from cooking oil in a food fryer;

FIG. 2 is a partly-sectioned side elevation of the filter appliance shown in FIG. 1 and to a slightly larger scale; and FIG. 3 is a cross-sectional view on the line III—III in FIG. 2.

In FIG. 1 of the drawings, the filtering appliance consists of an elongate casing means indicated generally by reference numeral 10 and having an intake nozzle 11 at one end of the casing means 10 for sweeping over the floor 12 of a food fryer part of which is indicated by reference numeral 13. A hand grip 14 is arranged at and secured to the other end of the casing means 10 which, together with the nozzle 11 and the hand grip means 14 is dimensioned consistently with single-handed portable use of the appliance. A discharge duct 15 extends from within the casing means 10 and is arranged to discharge adjacent the outside of the casing means. The food fryer 13 is shown to contain cooking oil 16; and in use of the appliance the nozzle 11 and the adjacent end portion of the casing means 10 is immersed in the oil 16 and the appliance is operated to suck oil in through the nozzle 11 and discharge filtered oil through the discharge duct 15. Intake and discharge of oil is effected by a motor-and-pump means (not shown in FIG. 1) within the casing means 10; and filtering of the oil is effected by a filter (not shown in FIG. 1) also within the casing means 10.

The appliance is designed to intake and discharge oil at a rate of the order of 20 liters per minute. A sweeping motion of the appliance with the nozzle 11 close to the floor 12 effectively picks up particulate material from the floor. Otherwise, even with the appliance held motionless with the nozzle 11 and the discharge duct 15 immersed, a marked improvement in the condition of the cooking oil is achieved within a few minutes for an average size of food fryer.

The construction of the appliance of FIG. 1 is more particularly described as follows with reference to FIGS. 2 and 3 in which parts corresponding with those in FIG. 1 are given the same reference numerals as used in FIG. 1.

The casing means 10 consists of a tubular casing 17 and a motor-and-pump housing 18, the casing 17 being assembled to the housing 18 by means of screw-threaded rings 19 the inner one of which is fixed to the body 20 of a pump 21. The pump body 20 has a pump intake duct 22 and thus serves as an apertured fixed wall adjacent one end of the casing 17. The other end of the casing 17 is provided with a removable closure 23 which merges with the intake nozzle 11. Within the closure 23, there is a partition 24 providing a seat for one end of a compression spring 25 and having a circular array of openings 26 for the passage of oil through the appliance.

The other end of the compression spring 25 seats on a second, shiftable, partition 27 which also is provided with a circular array of openings 28 for the passage of oil through the appliance. The partition 27 serves as a closure plate which abuts and closes one end of a filter indicated by reference numeral 29 and which is of generally hollow cylindrical configuration. More particularly, the filter 29 consists of a stack of mutually interleaved annular elements 30, 31 in which the elements 30 are of relatively large diameter and the elements 31 are of relatively small diameter. All of these filter elements are cut from a sheet of filter material consisting of a mat of fibres bonded together to form a matrix with particulate filtering medium or media held within the matrix. Such a filter material is typically manufactured as filter pads and is available from Filtercorp Europe of Guildford, Surrey, GU4 7YX under the trade name SuperSorb. This filter material is particularly suited to the cleaning of cooking oil but is not available in "cartridge" configuration. Thus, the "cartridge" (or generally hollow cylindrical) configuration required for the present appliance is constructed from the aforementioned annular elements.

Opposite the closure plate 27, the filter 29 abuts the pump body 20 in engagement with an annular formation 32 which is chamfered to penetrate the abutting annular element 30 to prevent uncleaned cooking oil from bypassing the filter 29. Typically, the larger annular elements 30 have an outer diameter of 64 mm and the smaller annular elements 31 have an outer diameter of 48 mm. All of the annular elements have a core diameter of 26 mm and all of the annular elements are approximately 3.5 mm thick. These dimensions are found to be consistent with providing a relatively large outer surface of the filter in the interests of attaining relatively high filtering efficiency.

The filter material is charcoal impregnated (as manufactured) and is yieldable under compression. Thus, the stack of annular elements is not rigid in the axial direction. To deal with this, the compression spring 25 maintains an axial pressure on the filter 29 and the stack of annular elements is stabilised by an elongate former 33 the forward end of which is attached to the closure plate 27. The former 33 is of hollow cross-section with a triangular configuration as can be seen in FIG. 3 designed to permit free flow of filtered oil axially through the core of the filter 29 towards the pump intake duct 22. The axial length of the former 33 is short of the expected fully compressed length of the filter 29 so that the filter is always free to vary in length axially without the rear end face of the former 33 abutting the pump body 20. It will be appreciated that, in use, a pressure differential will exist between the outside and the inside of the filter 29 which pressure differential will increase and tend further to reduce the axial length of the filter as the filter becomes loaded with cleanings.

The pump 21 discharges into the discharge duct 15 and is driven by an electric motor 34 designed for relatively low voltage operation and supplied from a rechargeable battery pack (not shown). The electric motor 34 is connected with a sensing/switching device 35 adapted to switch the motor off upon sensing a motor current in excess of a predetermined value. This arrangement thus monitors the condition of the filter 29 by relating the motor current to the condition of the filter on the basis that progressive loading of the filter with material cleanings from the oil being cleaned will cause an increase of loading of the motor and a consequent increase in motor current.

The filter construction described above makes available the benefit of a "cartridge" type of filter construction using a filter material which does not lend itself to production in "cartridge" form. A mat of fibres bonded together to form a matrix with particulate filtering medium or media (eg. activated charcoal, silicate etc.) is produced in sheet form from a slurry.

We claim:

1. A filtering device comprising:
   a casing comprising an inlet opening and an outlet opening;
   a filter located in the casing between the inlet opening and the outlet opening;
   a pump mounted in the casing for inducing a continuous flow of liquid through the inlet opening, the filter and the outlet opening; and;
   a motor for driving the pump; wherein the casing is elongate, the inlet opening comprises an intake nozzle, and the outlet opening comprises a discharge duct extending from within the casing and arranged to discharge adjacent the outside of the casing, said intake nozzle and discharge duct being located directly towards one end of the casing, said one end of the casing being adapted for location in a body of liquid such that, during operation of the filtering device, liquid is simultaneously drawn from and returned to said body of liquid.

2. The filtering device of claim 1, wherein said inlet opening is defined by an elongate intake nozzle.

3. The filtering device of claim 1, wherein the filter is located towards said one end of the casing, and the pump and motor are located towards another end of the casing.

4. The filtering device of claim 1, further comprising an operator handle provided on the casing.

5. The filtering device of claim 4, wherein the operator handle is located towards another end of the casing.

6. The filtering device of claim 5, wherein the operator handle includes a trigger switch for controlling operation of the motor.

7. The filtering device of claim 1, wherein the motor is an electric motor, and the device includes a sensor for sensing current drawn by the motor, said sensor being adapted to switch the motor off upon sensing a motor current in excess of a predetermined value, indicative of a loading of the filter.

8. A filtering appliance for use in removing debris from cooking oil in a food fryer, comprising an elongate casing, an intake nozzle at one end of the casing for sweeping over the floor of a food fryer, a hand grip arranged at and secured to another end of the casing, the casing the nozzle and the hand grip together being dimensioned consistently with single-handed portable use of the appliance, a discharge duct extending from within the casing and arranged to discharge adjacent the outside of the casing, a filter within the casing, and a motor and pump within the casing for moving cooking oil sequentially through said nozzle said filter and said discharge duct.

9. A filtering appliance for use in removing debris from cooking oil in a food fryer, comprising:
   a casing comprising an inlet opening and an outlet opening;
   a filter located in the casing between the inlet opening and the outlet opening;
   a pump mounted in the casing for inducing a continuous flow of cooking oil through the inlet opening, the filter and the outlet opening; and;
   a motor for driving the pump; wherein the casing is elongate, the inlet opening comprises an intake nozzle for sweeping over the floor of a food fryer, and the outlet opening comprises a discharge duct, said intake nozzle and discharge duct being located directly towards one end of the casing, said one end of the casing being adapted for location in a body of cooking oil such that, during operation of the filtering device, cooking oil is simultaneously drawn from and returned to said body of cooking oil.

* * * * *